April 16, 1968

A. E. HUSTON 3,378,721

CAMERA TUBE DEFLECTION SYSTEM FOR
PROVIDING BEAM SHUTTER ACTION

Filed June 1, 1964

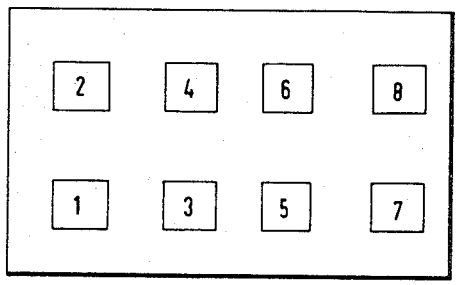
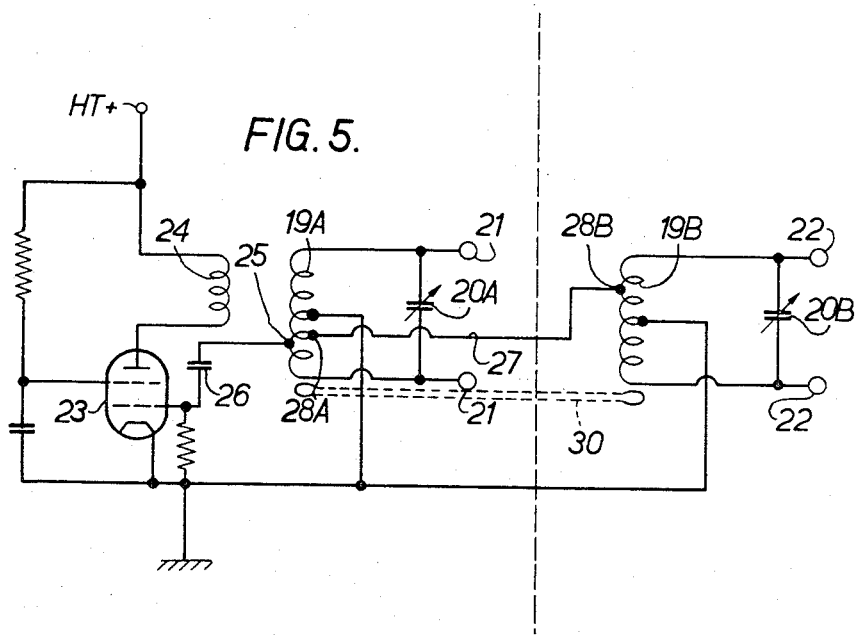

United States Patent Office 3,378,721
Patented Apr. 16, 1968

3,378,721
CAMERA TUBE DEFLECTION SYSTEM FOR PROVIDING BEAM SHUTTER ACTION
Alexander Edward Huston, Earley, Reading, England, assignor to United Kingdom Atomic Energy Authority, London, England
Filed June 1, 1964, Ser. No. 371,350
Claims priority, application Great Britain, Jan. 3, 1964
434/64
3 Claims. (Cl. 315—30)

ABSTRACT OF THE DISCLOSURE

An image-tube camera includes an image-tube having a screen, an aperture plate arranged in the path of the electron beam of the image-tube, a pair of shutter deflection plates arranged to be traversed by the beam at one side of the aperture plate and a pair of compensating deflection plates arranged to be traversed by the beam at the other side of the aperture plate. First and second trains of electrical oscillations of the same frequency and wave form are applied between the pairs of shutter and compensating plates. The first train is applied between the shutter plates to sweep the beam periodically across the aperture to provide shutter action and the second train is applied between the compensating plates to produce an opposing field to immobilize the beam. The second train is displaced in phase relatively to the first train to provide two residence positions on the screen as the oscillation sweep alternately in positive and negative directions.

---

This invention relates to high-speed cameras of the type which employ electron image-tubes.

In such cameras an image is focused on to the photo-cathode of an image tube, where it is converted into an electron beam. The electron beam is manipulated electrically to provide focussing, shuttering and deflection, and the beam is then allowed to impinge on the screen of the tube, which receives an electron image corresponding to the original image. The screen may carry a phosphor for producing a visible image which can be photographed, or it may be a storage screen which can be scanned to produce an electrical signal.

When it is desired to produce a sequence of separate photographs or the like, it is necessary that the beam should have a plurality of residence positions on the screen and should be switched off during deflection from one residence position to another.

In papers by Butslov et al. published in the Proceedings of the 4th International Congress on High-Speed Photography (Cologne, 1958), pp. 230–242, and by Komelkov et al., published in the Proceedings of the 5th Congress (Washington, 1960) pp.118–122, there is described a form of camera in which shutter action is obtained by directing the beam between two sets of deflector plates located on either side of a plate containing a small aperture. To the first set of plates a D.C. bias is applied which causes the beam to strike the apertured plate instead of passing through the aperture. Successive exposures are obtained by applying to these plates a train of flat-topped pulses which neutralize the D.C. bias and cause the beam to pass through the aperture. Because these pulses have finite rise-times, during which the beam axis moves relative to the aperture, an equal and opposite pulse is applied simultaneously to the second pair of plates to compensate for this movement and so immobilize the beam at its residence position on the screen. Two additional pairs of deflector plates at right angles to one another are provided to which staircase waveforms are applied to shift the beam to a new residence position between successive exposures, so that a pattern of successive exposures or frame is obtained on the screen.

In practice the above method of obtaining shutter action is somewhat complex, since the generation of flat-topped pulses of short duration and large, constant amplitude is difficult and requires the use of complicated circuits, particularly where the exposure repetition rate, i.e., the number of frames per second, is required to be high. Problems of drift also arise. The need to utilize subsequently two sets of interlocking shift waveforms for producing the pattern of successive frames adds to the complication of the arrangement.

In a paper published in the Proceedings of the Second Symposium on Photo-Electronic Image Devices (London) Sept. 5–8, 1961, pp. 249–263 there is described an alternative method of obtaining shutter action in which shutter and compensating waveforms of ramp form are applied to sweep the beam diametrically across the aperture, the exposure time being determined by the aperture dimensions and the rate of rise of the ramp waveform. However, the described arrangement provides only a single residence position of the beam on the screen (without using additional deflector plates) and large-amplitude ramp waveforms are not easy to generate.

In the present invention shutter action is still obtained by sweeping the beam diametrically across the aperture, but the shutter and compensating waveforms are so arranged that they provide not one but two residence positions of the beam on the screen, without using additional deflector plates. Moreover, this can be done using easily-generated sinusoidal waveforms instead of ramp waveforms. The invention thus doubles the number of consecutive exposures which can be displayed, without the complication of requiring an additional pair of deflector plates and an additional waveform generator to supply them, and enables the generation of the shutter and compensating waveforms to be simplified.

According to the present invention there is provided an image-tube camera including an image-tube having an aperture plate and means for applying opposing electric fields to the electron beam at each side of the plate so that the beam is periodically deflected to pass through the aperture for a defined time, thereby providing shutter action, but is immobile on striking the screen, said means being adapted to produce two trains of electrical oscillations of the same frequency and waveform, said waveforms having a portion which sweeps through a potential corresponding to the axial position of the beam relative to the aperture, one train being applied to sweep the beam periodically across the aperture to provide shutter action, and the other train being applied to produce the opposing field at the other side thereof to immobilize the beam.

To enable the nature of the present invention to be more readily understood, attention is directed, by way of example to the accompanying drawings wherein FIGURE 1 is a diagram showing the electrode configuration of an image-tube suitable for use in the present camera.

FIGURE 4 shows the sequence of frames in an 8-frame photograph.

FIGURE 5 is a circuit diagram of an oscillator for providing the waveforms of FIGURE 2.

Figure 1:
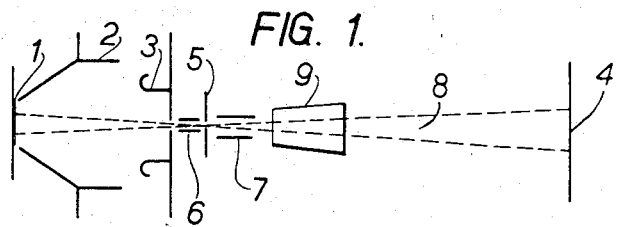

Referring to FIGURE 1, the image-tube shown comprises a photocathode 1, a focussing electrode 2, an anode 3, and a fluorescent screen 4. Between the anode 3 and the screen 4 is located a plate 5 having a central aperture, on each side of which are located pairs of deflector plates 6 and 7 termed shutter plates and compensating plates respectively, arranged to provide deflection of the electron beam 8 in the same vertical plane.

Another pair of plates 9 is provided to produce beam shift in the horizontal plane.

Figure 2:
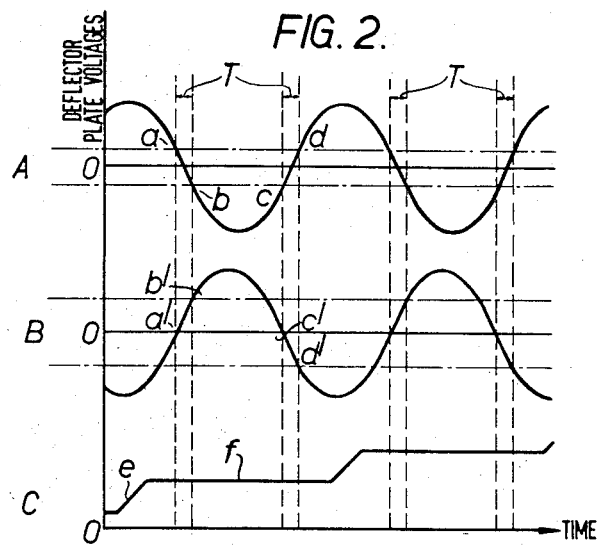
FIGURE 2 shows deflection waveforms used in the present camera.

FIGURE 2 shows at A a sinusoidal waveform which is applied between the shutter plates 6 and at B a sinusoidal waveform which is applied between the compensating plates 7. An exposure is obtained, i.e., the beam passes through the aperture in plate 5, each time the potential between plates 6 is within the range defined by the interrupted horizontal lines shown at A. This range is symmetrical about zero, at which potential the beam passes through the centre of the aperture. The duration of each exposure is shown as T; there are thus two exposures or frames per cycle of the waveform, shown as occurring during portions ab and cd respectively of the waveform. The amplitude of the waveform is made such that the effective exposure time T is approximately one fifth of the interval between successive exposures.

The sinusoidal waveform shown at B has the same amplitude as that shown at A, plates 6 and 7 having the same deflection sensitivity, but differs in phase from it by 180° plus a small angle, in the present case about 21°. As a result, during alternate exposures the beam image is immobilised by two different portions of waveform B. For example, the exposure given by portion ab of waveform A is compensated by portion a'b' of waveform B, and the exposure given by cd by portion c'd'. As the mean potentials of portions a'b' and c'd' are equal but of positive and negative polarities respectively, alternate beam images appear on the screen in two positions one above the other. It will thus be seen that use of the described waveforms serves to provide both immobilisation of the image and two residence positions.

The immobilisation of the two images is not quite perfect since the shapes of the portions a'b' and c'd' are not exact replicas of portions ab and cd, but is found sufficiently accurate provided the exposure duration T does not exceed one-fifth of the interval between exposures.

The arrangement as so far described provides only two images, each consisting of a train of superimposed exposures. In order to separate them into a sequence of discrete images, the beam 8 is deflected horizontally between successive pairs of images, by means of the plates 9. To plates 9 is applied a staircase waveform which is synchronised with waveform A of FIGURE 2 so that the step-portions e of the staircase occur between exposures and the plateau-portions f are of sufficient duration to allow two exposures to occur before the next step-portion. The relative phasing of the staircase with the sinusoidal waveforms is shown at C in FIGURE 2. A shift bias applied to plates 9 maintains sufficient deflection to keep the electron beam just beyond the edge of the screen 4 until a trigger pulse derived from the event to be photographed arrives, when the staircase generator starts to operate; the sinusoidal generator providing waveforms A and B runs continuously. The staircase generator is supplied with a synchronizing signal from the sinusoidal oscillator to ensure the phase relationship shown in FIGURE 2.

Figure 3:
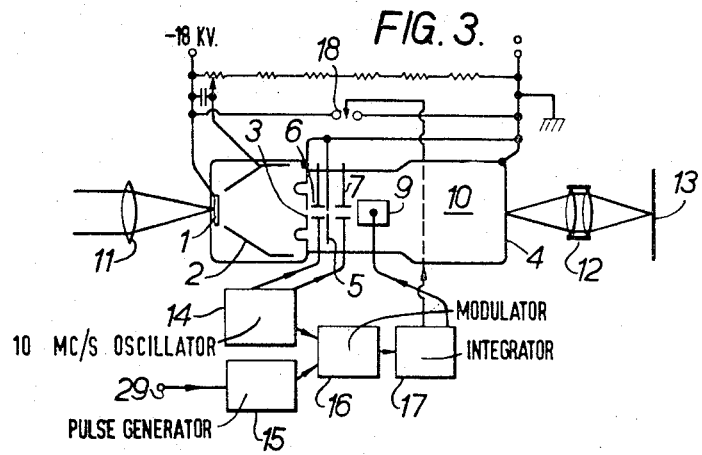
FIGURE 3 is a schematic circuit diagram of an embodiment of the present camera.

The mode of operation having been described, the constituent parts of the present embodiment will now be described in more detail. In FIGURE 3, the components of the image-tube 10 are designated by the same numerals as in FIGURE 1. In the tube used, which has been described in the Proceedings of the 6th International Congress on High Speed Photography (The Hague 1962) pp. 357–361, the shutter and compensating plates 6 and 7 and the horizontal shift plates 9 require a deflection potential of 400 v./cm., when the anode voltage is 18 kv. The shutter plates 6 require the application of 600 v. to deflect the beam from the centre of the aperture to the fully cut-off condition.

Also shown in FIGURE 3 are the objective lens 11 for focussing the image of the object to be photographed on to the photocathode 1, and the lens 12 of the camera which records on film 13 the luminescent images produced on screen 4.

The sinusoidal waveforms A and B of FIGURE 2 are generated by a single 10 mc./s. oscillator 14 employing a pair of coupled tuned circuits, each circuit being centre-tapped to give an output symmetrical about zero, and tunable to enable their frequency and phase relationship to be adjusted to the required values. This oscillator is hereinafter described in more detail with reference to FIGURE 5. At 10 mc./s. the exposure duration T is 10 nanoseconds and the interval between frames 50 nanoseconds.

The staircase waveform for the shift deflector plates 9 is generated in a three-stage circuit. The input trigger, a positive pulse of amplitude not less than 50 v., is applied to terminal 29 and trips a pulse generator 15 which produces a flat-topped pulse of duration of 10 microseconds. The pulse is fed to a modulator 16, along with a small portion of the output of the 10 mc./s. oscillator 14. The output of the modulator 16 is, therefore, a train of 10 mc./s. oscillations, initiated by the input trigger, and lasting for 10 microseconds. This signal is fed to the grid of valve acting as an integrator 17 which is initially biassed beyond cut-off, so that it conducts only on the positive peaks of the train of oscillations. The shift plates 9 of the image tube are connected to anode and cathode of the integrator valve, and form a capacitance which, initially charged to 3000 v., is gradually discharged in steps by the successive conduction periods of the integrator valve, the steps occurring (see waveform A of FIGURE 2) midway between pairs of exposures. The anode and cathode resistors of the valve are sufficiently large to prevent appreciable recharging of this capacitance between steps. A symmetrical drive about zero is facilitated by using a low-capacity heater transformer for the integrator valve.

The voltage amplitude of the step portions is controlled by the current drawn by the integrator valve, and may be adjusted so that any even number of frames from 8 to 16 inclusive is displayed on the tube screen. FIGURE 4 shows the order in which 8 consecutive frames appear on the screen and on the final photograph. It will be appreciated that maximum resolution is not attainable for any number of frames greater than 8, since it is necessary to reduce their size in order to accommodate them on the screen.

As soon as the sequence of images has been displayed, the camera is switched off to prevent the continuing illumination from the event causing further photoemission which may result in unwanted diffuse light output from the screen. This is done by arranging that a low-jitter spark switch 18 operates to short-circuit the 18 kv. tube supply at the completion of the staircase generator cycle.

It has been found that the stabilities of the phase relationship and of the amplitude relationship of the two waveform trains A and B in FIGURE 2 are extremely critical. FIGURE 5 shows a novel form of 10 mc./s. oscillator which has been devised to provide the required stability.

In the present oscillator two similar LC resonant circuits are used to produce the two wave trains, regenerative feedback being applied to only one of the circuits and the two resonant circuits being coupled together to give near-critical coupling. The coupling may be a single wire tapped to substantially equivalent points on the inductances of the resonant circuits, or by a simple inductance loop consisting of a single closed loop. The effect of such coupling is to maintain within close limits the phase and amplitude relationships between the two oscillatory circuits in the manner required by the camera, despite changes in the load or output conditions of either circuit.

In FIGURE 5 centre-tapped inductances 19A and 19B form with variable capacitances 20A and 20B two similar parallel resonant circuits. Symmetrical outputs to the pairs of plates 6 and 7 are taken from the pairs of terminals 21 and 22 respectively. A tetrode 23 has its screen grid conventionally connected to HT+. The control grid of tetrode 23 is connected to a tapping 25 on inductance 19A via a capacitor 26. The anode of the tetrode is connected to HT via a winding 24 which provides regenerative inductive feedback to inductance 19A.

Coupling between the two parallel resonant circuits is provided by wire 27 connected between tapping point 28A on inductance 19A and tapping point 28B on inductance 19B. The tapping points are both located the same distance from the centre-taps of the inductances. The precise location is not critical, and up to a quarter of a turn difference can be tolerated. Wire 27 consisted, in one embodiment, of five inches of copper wire of 16 gauge. Wire 27 can be replaced by a simple coupling loop as described above and shown at 30. The ends of the loop are located in the fields of inductances 19A and 19B, the precise location being non-critical. As the distance of the tapping points 28A and 28B increases from the centre taps the phase angle difference decreases. A corresponding effect can be achieved with the inductively coupled loop by increasing the separation between the ends of the loop and the respective inductances 19A and 19B. The required deviation from the exact antiphase condition results from the two circuits having slightly different resonant frequencies, and is adjusted by capacitors 20A and 20B to give the best images.

The two resonant circuits, which are of high Q (500), are screened from one another to prevent excessive coupling. They provide peak-to-peak outputs of 1.5 kv. having the required phase difference of about 201°, i.e. 180°+21°.

Oscillations other than sinusoidal can be used for the shutter and compensating functions. For example triangular waves would be advantageous.

I claim:
1. In an image-tube camera including an image-tube having a screen, an aperture plate arranged in the path of the electron beam of the image-tube, a pair of shutter deflection plates arranged to be traversed by the beam at one side of the aperture plate and a pair of compensating deflection plates arranged to be traversed by the beam at the other side of the aperture plate, the provision of means adapted to apply between said pairs of shutter and compensating plates respectively two trains of electrical oscillations of the same frequency and waveform, said waveforms having a portion which sweeps through a potential corresponding to the axial position of the beam relative to the aperture, one train being applied between the shutter plates to sweep the beam periodically across the aperture to provide shutter action, and the other train being applied between the compensating plates to produce an opposing field to immobilize the beam.

2. In an image-tube camera, the provision of means as claimed in claim 1, wherein said two trains of oscillations are sinusoidal, said one train being applied to sweep the beam across the aperture as said oscillations sweep through substantially their zero-voltage condition.

3. In an image-tube camera as claimed in claim 1, said image-tube including a pair of shift plates arranged to deflect the electron beam in a direction normal to the direction of deflection produced by said shutter and compensating plates, the provision of means adapted to apply between said pair of shift plates a staircase waveform synchronized with said trains to provide at least one further pair of residence positions on the screen.

References Cited 439,636, British patent specification, Dec. 11, 1935.

ROBERT L. GRIFFIN, *Primary Examiner.*

JOHN W. CALDWELL, *Examiner.*

R. L. RICHARDSON, *Assistant Examiner.*